July 25, 1967    H. E. MELTZER    3,332,284
TEMPERATURE MEASURING AND INDICATING ATTACHMENT FOR HEAT GUNS
Filed Oct. 15, 1965    2 Sheets-Sheet 1
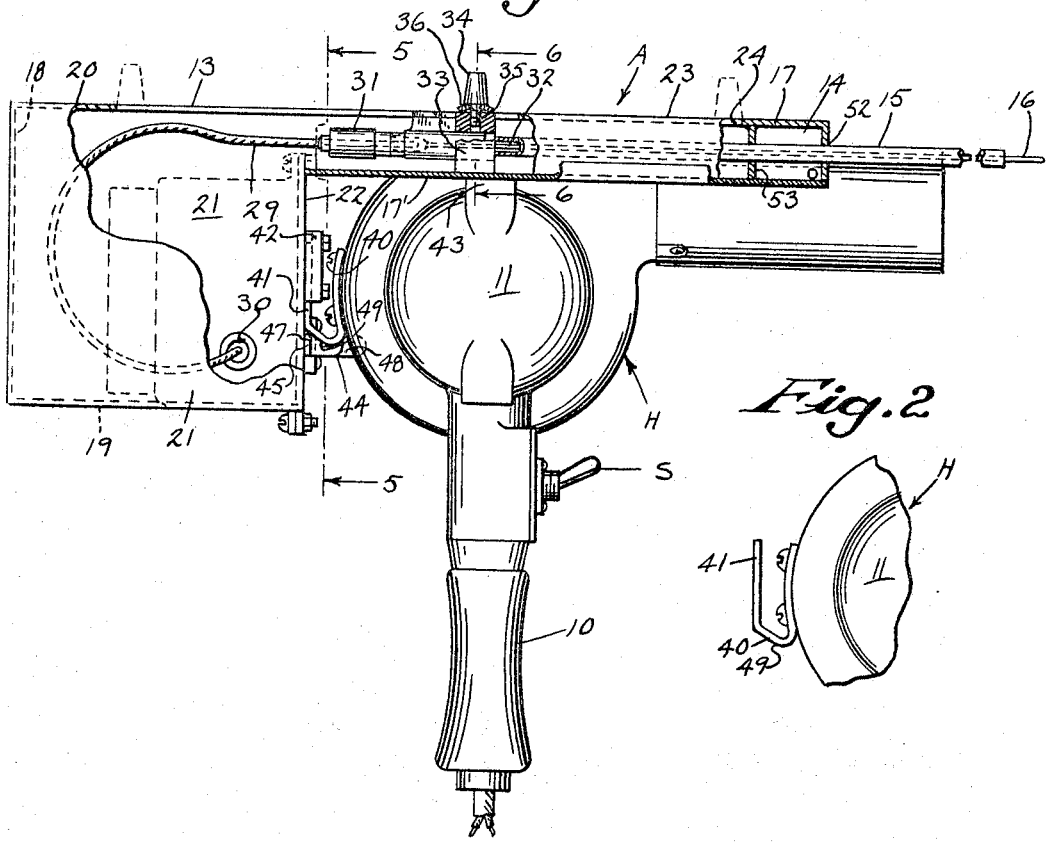
INVENTOR
HENRY E. MELTZER
BY George W. Wright

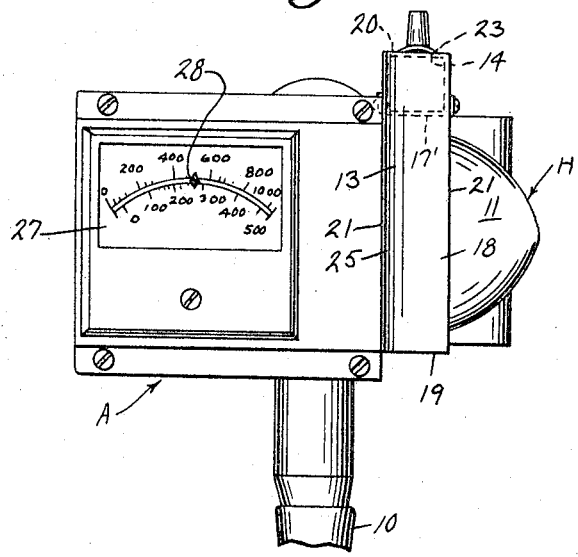
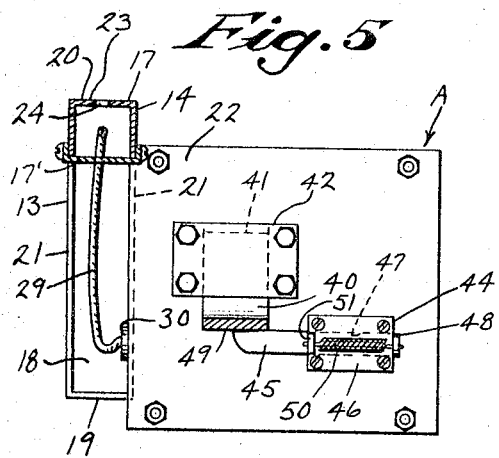
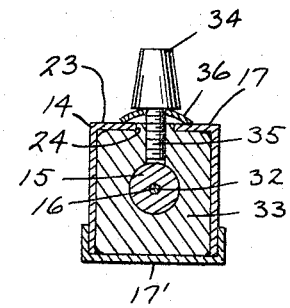

United States Patent Office

3,332,284
Patented July 25, 1967

3,332,284
TEMPERATURE MEASURING AND INDICATING ATTACHMENT FOR HEAT GUNS
Henry E. Meltzer, 1745 Flett St., Racine, Wis. 53403
Filed Oct. 15, 1965, Ser. No. 496,445
4 Claims. (Cl. 73—343)

ABSTRACT OF THE DISCLOSURE

An attachment for heat guns for measuring the temperature of the heated air at various distances from the nozzle of the gun. A heat sensing element is adjustably carried by the forwardly extending casing portion and extends directly in the path of the heated air flow whereby the temperature of the air can be measured at predetermined points as it emanates from the heat gun nozzle.

---

This invention appertains to heat guns and attachments thereto, and more particularly to new and useful improvements in an attachment for a heat gun to indicate the temperature of the heated air at desired working distances from the nozzle of the gun.

In certain types of work, the use of a heat gun of the type wherein heated air is forcibly blown from a nozzle end is utilized for shrinking, drying or softening different materials (particularly in the electronics field where extremely small elements are needed) and wherein certain different materials are united by shrinking one material to another, different types of heated air are of great advantage. The electronics field is comparatively new and the shrink process which relies primarily on the different co-efficients of expansion of construction of different materials is also relatively recent. It is important in this type of joining to provide temperatures within an exact range. If the heated air is too hot, the parts may deform or run and if not hot enough, then fusing of the parts or shrinking of the same will not take place.

Therefore, it would be advantageous to be able to ascertain the temperature of the heated air emanating from the nozzle at a particular distance from the nozzle.

In most heat gun structures additional heating elements are provided which may be turned on or off to provide varying temperatures of the air, but as is obvious, the heated air emanating from the nozzle end is hotter than the heated air a short distance therefrom.

Various types of portable means and temperature indicators can be utilized to measure the heat on the articles being treated. Since the temperature needed to perform certain work is known, it would be advantageous to hold the heat gun in the exact position necessary to give the particular temperature.

It is, therefore, a primary object of my present invention to provide an attachment for heat guns which will accurately measure and reflect the temperature of the heated air at various distances from the end of the nozzle.

Another important object is to provide a nozzle attachment for a heat gun wherein the temperature sensing element may be adjusted to be positioned at different distances from the end of the heat gun nozzle.

A further object of the present invention is to provide an attachment for a heat gun which may be quickly and easily secured to the gun in such a manner that it will be firmly and positively held thereto without any danger of movement or of becoming disengaged from the gun.

A salient feature of the present invention resides in providing a temperature indicating device for heat guns wherein the indicia indicating the temperature may be quickly and easily observed and wherein means is provided to ascertain the temperature of the air at various effective work distances from the articles being treated.

A more specific object of the present invention resides in providing a temperature indicating device secured in a casing to the rear of the heat gun and having a forwardly extending channel carrying an adjustable tube for the temperature sensing element.

A further object of the present invention is to provide a simple, practical and reliable construction that is economical to manufacture, easy to assemble and positive in its operation, and which can be readily associated with different types of heat guns.

With the above and other objects in view, as will more readily appear as the nature of the invention is better understood, the same consists in the novel combination and arrangement of parts hereinafter more fully described, illustrated and claimed.

A preferred and practical embodiment of the invention is shown in the accompanying drawings, in which, FIGURE 1 is a side elevational view in perspective showing the attachment secured to one type of heat gun, certain parts being broken away and in section to further illustrate details in its construction;

FIGURE 2 is a side elevational fragmentary view illustrating the casing of the heat gun and showing more particularly the single bracket attached thereto for receiving and securing the temperature indicating attachment;

FIGURE 3 is a top plan view of the attachment shown secured to the heat gun, with parts being broken away and in section to further illustrate details of construction;

FIGURE 4 is a rear elevational view of the heat gun and attachment;

FIGURE 5 is a transverse section through the attachment taken on the line 5—5 of FIGURE 1 of the drawings and looking in the direction of the arrows, and FIGURE 6 is a transverse section through the forwardly extending channel portion of the attachment, the section being taken on the line 6—6 of FIGURE 1, looking in the direction of the arrows.

A clearer understanding of the construction and method of operation of this invention may be had by referring to the drawings (forming a part of the present specification) wherein like reference characters designate the same or similar parts throughout the several views.

The letter A generally indicates one type of the improved attachment for heat guns H. The heat gun H forms no part of the present invention and may be of any desired construction, but for purposes of illustration the same is shown with a vertically extending handle grip 10, a casing 11 for the motor and a fan, a forwardly extending nozzle carrying the heat elements necessary to raise the temperature of the air and direct the same toward the work.

As previously mentioned, particularly in the electronics field, certain small parts may be placed in a basket and heated air directed toward the parts from the heat gun. In most work in the electronics field, the degree of temperature i.e., heated air contacting the elements to be treated is critical and therefore, it is necessary to determine the exact distance from the nozzle of the gun that this critical temperature is reached. Thus, the novel attachment A is provided to accomplish this purpose, and the same includes broadly a main casing or housing 13 to one side of which is secured an elongated forwardly extending channel 14 which carries a slidable and adjustable tube 15 for the sensing element 16. The shape of casing 13 and the walls 17 for channel 14 may be round, hexagonal etc., but preferably the main casing 13 is boxlike in shape to provide a rear wall 18, bottom wall 19, top wall 20, side walls 21 and a forward vertical wall 22. The walls 17 providing the forwardly extending channel portion 14 are substantially flat and rectangular in shape. The top wall 23 is provided with an elongated slot 24, the purpose of which will become readily apparent as the description proceeds.

The rear portion of the forwardly extending channel member 14 may be shaped to conform to the side wall 21 of casing 13 but the walls thereof extend rearwardly beyond the wall 21 as indicated by the reference numeral 25. Within the casing 13 is housed the mechanism 26 necessary to record and indicate the temperature and the rear wall carries a dial 27 over which a needle 28 moves to give a visual indication of the temperature at the point where the senser element 16 is located. The indicator 26 and its associated parts may be of any desired known construction, now on the market and the indicator is connected to the senser through a wire 29 which is placed through a grommet and opening 30 in the wall 21 of the casing 13 and is connected directly through a suitable coupling 31 to the rear portion 32 of the senser element 16. The senser element or wire is preferably encased in the tube 15 to give strength and rigidity to the element and tube 15 is in turn anchored to a sliding block 33, which is positioned in the channel 14 under the slot 24 and is in operative connection with the coupling 31, and as mentioned, tube 15. To the upper surface of block 33 I secure a knob or handle 34 and this handle rides on the outside above the slot 24 and carries a threaded shank 35 which is received in a suitable correspondingly threaded aperture of the block 33. I also preferably provide a spring washer 36 between the upper surface of wall 17 and the under surface of the handle or knob 34 so that by turning the knob in one direction the block may be securely locked against the movement within the channel but by turning the knob in another direction the block by means of the handle may be slid longitudinally with the channel 14 to move the tube 15 and more particularly, the senser element 16 to and from the end of the nozzle 12. It should be noted that the senser element 16 at its forward end is bent at a right angle so as to protrude directly in front of the heated air stream emanating from the nozzle.

A salient feature of this invention also resides in the simple and effective way of fastening and unfastening the attachment A in relation to the heat gun. The heat gun per se need not be modified appreciably except to secure to the rear portion of the casing a U-shaped bracket 40 so that a vertically spaced upstanding leg 41 thereof is provided to fit within the U-shaped channel formed by the strap 42 secured to the rear wall 22 of casing 13. Thus, basically the attachment is quickly secured by merely aligning the channel formed in strap 42 with the upstanding leg 41 of the bracket and dropping it into place. The forwardly extending walls 17, particularly bottom 17' thereof, will rest directly on the upper portion of the motor casing as shown. In the type of heat gun shown, the wall 17 rests on the flat portion 43 of the brush holders for the motor, and thus it can be seen that the attachment A can be quickly associated with the heat gun. Since the heat gun may be used in some awkward positions, particulary when working on elements secured to a machine or the like, it is possible that the attachment could slip off of the gun and therefore to overcome this, and to firmly secure the attachment to the gun I provide the latching means 44.

Attention is directed, particularly to FIGURES 3 and 5 of the drawings, wherein details in the construction of the latching means 44 are specifically illustrated. As shown, therefore, latching means 44 includes a slide bolt member 45 held to the rear wall 22 of housing 13 by means of bracket 46 and this bracket 46 is provided with an opening 47 through which the slide bolt is received. The rear end portion of slide bolt 45 is bent at right angles to provide an upstanding finger or handles 48 so that the forward portion of the slide bolt 45 can be moved from a position under the U-wall 49 of bracket 40 to a retracted position free of the portion 49 thereby allowing the entire attachment A to be lifted from leg 41 of the brackets and remove from the heat gun. Slide bolt 45 is continually urged in its closed position by means of a spring 50 which is secured at one end to the upstanding handle or finger 48 and has its other end attached to an upstanding ear 51 formed integral with or secured to bracket 46.

It should also be noted that tube 15 acts as a guide and strengthening means for the senser element 16 and in turn tube 15 is slidably received in an aperture formed in the forward wall 52 of the longitudinally extending portion of casing or housing 13. I also provide an intermediate partition 53 formed with a suitable alignment aperture to further guide and hold tube 15 in its straight longitudinally extending position. Thus, it can be seen that the heat gun can be used without the attachment for ordinary purposes but where it is necessary to provide an exact temperature of heated air at a given point, attachment A can then be readily affixed to the heat gun and this is accomplished by merely inserting leg 41 of bracket 40 into strap 42 and then allowing latch bolt 45 to be moved to its full line position under the U-shaped portion 49. Thus, with the longitudinally extending channel resting on a portion of the housing of the gun and with the rear wall 22 securely fastened to the gun, the attachment is ready for use and cannot be jarred or moved from its proper position. With the heat gun toggle switch S turned on and allowed to run for a few minutes so that an even heat flow is provided, the temperature at any given point from the nozzle 12 can be easily and readily read, and the desired temperature found by sliding knob 34 along slot 24 until the senser element 16 indicates through dial 27 the desired correct temperature. Then the gun can be held exactly at the proper distance from the work.

It should also be noted that in order to allow the senser element to be moved and positioned at various distances in relation to the end of the nozzle 12 a portion 55 of wire 29 is housed within the narrow elongated space 56 in the form of a loop so that movement of rod 15 will allow the wire to move from its full line position FIGURE 1 to approximately its dotted line position without danger of stretching or pulling the points of the wire where it is connected to the temperature sensitive and indicating elements 26.

From the foregoing, therefore, it can be seen that I have provided a nozzle attachment which converts any standard heat gun into an instrument that can be used with precision and wherein within desired ranges, the temperature of the air at any given point from the nozzle can be accurately determined, and while I have shown and described certain specific embodiments of the invention it will be understood that these are merely for the purpose of illustration and description, and that various forms may be devised and that changes may be made in the proportions and minor details of construction without departing from the spirit of the invention or scope of the appended claims.

I claim:

1. A temperature measuring and indicating device for heat guns and the like of the type having a motor housing and a forwardly extending nozzle through which the heated air is directed, including a main casing, a temperature measuring means carried in said main casing having a visual temperature indicating means associated therewith, an integral forwardly extending casing portion defining a longitudinally extending channel therethrough in substantially parallel relationship with said heat gun nozzle, a heat sensing element carried in said channel, said heat sensing element having a forwardly extending portion positioned directly in the path of said heated air flow, means secured to said heat sensing element for adjustably moving said element within said channel to position said forwardly extending portion at various distances from said nozzle end, and means for securing said attachment to said heat gun.

2. A temperature measuring and indicating device as set forth in claim 1, wherein said adjustable means for said heat sensing element includes, a sliding block received in said channel, a hollow protective tube secured to said block and projecting beyond the forward end termination of said channel, the major portion of said heat sensing element being received within said tube and operatively connected to said temperature measuring device, and an upstanding knob secured to said sliding block projecting through a slot in said forwardly extending casing for moving said block, tube and heat sensing element toward and away from said nozzle.

3. A temperature measuring and indicating device as set forth in claim 1, wherein said means for securing said device to said heat gun includes, a U-shaped bracket having one leg secured to said motor housing with said other leg in substantially parallel relation thereto, a strap secured to the respective adjacent wall of said device and being provided with a channel to receive said free parallel leg of said U-shaped bracket, a portion of said forwardly extending channel contacting a respective portion of said motor housing, and means for locking said device to said heat gun.

4. A temperature measuring and indicating device as set forth in claim 1, wherein said means for locking said device to said heat gun includes, a latch means including a transversely slidable latch bolt adapted to engage the under surface of said U-shaped bracket in its operative position.

References Cited

UNITED STATES PATENTS

| | | | |
|---|---|---|---|
| 969,114 | 8/1910 | Packard | 73—343 |
| 1,190,978 | 7/1916 | Bliss | 73—343 |
| 1,229,704 | 6/1917 | Berry | 73—343 |
| 1,442,574 | 1/1923 | Johnson | 73—349 |

DAVID SCHONBERG, *Primary Examiner.*

LOUIS R. PRINCE, *Examiner.*

N. B. SIEGEL, *Assistant Examiner.*